Feb. 26, 1935.   W. A. BOUGHTON   1,992,907
FLEXIBLE LAMINATED INSULATING MATERIAL AND PRODUCT
Filed Sept. 28, 1932
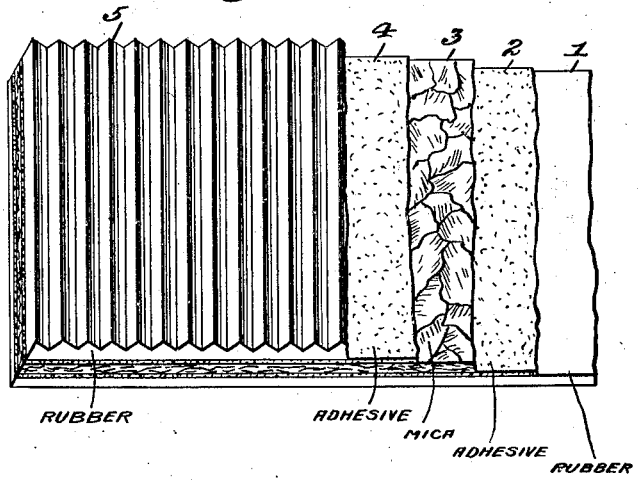
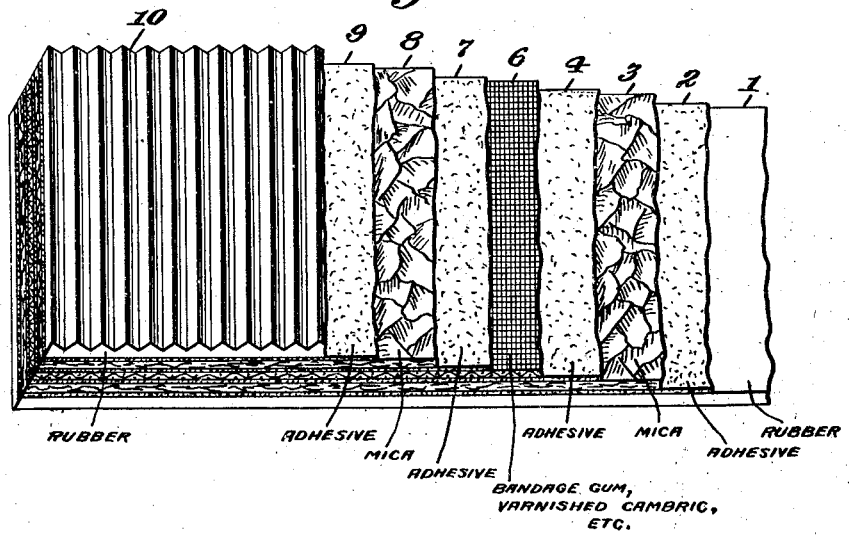
Inventor:
Willis A. Boughton Patented Feb. 26, 1935

1,992,907

UNITED STATES PATENT OFFICE 1,992,907

FLEXIBLE LAMINATED INSULATING MATERIAL AND PRODUCT

Willis A. Boughton, Cambridge, Mass., assignor to New England Mica Co., Waltham, Mass., a corporation of Massachusetts Application September 28, 1932, Serial No. 635,255

4 Claims. (Cl. 154—2.6)

This invention relates to improvements in the art of making laminated flexible electrically insulating material in sheet form, and articles manufactured therefrom, including such commercial materials as switchboard matting, insulating blankets, insulating gloves and boots, and the like.

An object of the invention is the production of articles of the above general type from laminated insulating material having markedly greater dielectric strength than that of the commercial products used for such purposes now in general use.

Another object is the production of such articles at an economical price, not essentially greater than that of the less satisfactory corresponding articles at present available.

Another object is to provide a new method of making flexible laminated insulating products involving a new principle, which new method is believed to be responsible in part at least for the increase in dielectric strength obtained.

Other objects and applications of the invention will be recognized by those familiar with the production and uses of such materials.

1. Switchboard matting

This material is furnished to the trade in sheet form, often in strips a yard wide and twenty-five or more feet long. Generally it is corrugated on one side, and cloth-smooth on the other, and is placed corrugated side up in front of high voltage, and also low voltage, switchboards, there acting both as an insulator and as a dielectric against possible passage of electric current through the body of the switchboard operator to the floor. It becomes then a highly essential safeguard to the security of the operator; and with the increasing use of high voltage transmission and the steady raising of the voltages employed, the manufacture and use of matting of the highest possible dielectric strength becomes a definite necessity.

The best available commercial product is made by integrating a cloth layer between two sheets of high quality rubber sheet material, the whole having a thickness of about one-fourth inch, and in this thickness showing a dielectric strength or a puncture voltage of some 40,000 volts or less. This puncture value, however, is a maximum at the time of manufacture, and as is known, decreases slowly as the rubber ages. It may then eventually come to be an unsafe insulator and dielectric where high voltage currents are used.

After considerable experimental research, a new product has been developed which possesses superior qualities with regard to maximum dielectric strength offered, durability in hard service, and long life.

In the accompanying drawing, which illustrates laminated sheet products,

Fig. 1 illustrates a flexible laminated product comprising outer sheets of rubber, and an inner layer of mica flakes; the layers cemented by a suitable durable adhesive, and Fig. 2 illustrates a flexible multi-laminated sheet product consisting of outer sheets of rubber, inner layers of mica, and a layer of bandage gum, varnished cambric, or other insulating fabric, all of the several layers being united into an integral product by a suitable durable adhesive.

In general, the new product is composed of a multiplicity of layers of different kinds of insulating materials including rubber, flexible mica sheet, bandage gum, varnished cambric, oiled paper, Cellophane, vegetable parchment and the like. In all cases, however, rubber is used as the outer layer on both sides, the interior materials including always one or more layers of flexible mica sheet, and the adjoining surfaces being cemented together with an organic or inorganic adhesive. Examples of the adhesive cements include the general class of flexible mica sheet adhesives, rubber cements, and vulcanized or unvulcanized rubber, the viscous colloidal aqueous metaphosphate and viscous colloidal aqueous monoborate adhesives and the like.

In practice, a sheet is built up essentially as follows: As shown in Fig. 1, a rubber sheet 1 of the desired quality of surface and thickness, is laid on a table with the selected outer surface on the down side. To the inner or upper surface is applied a layer of suitable adhesive 2 and a sheet of other insulating material such as flexible mica 3 or the like is affixed thereto by rolling, rubbing, pressing, etc. The top is then covered with another layer of adhesive 4 and either the final outer corrugated rubber layer 5 is affixed thereto, or a sheet of some other insulating material is so affixed. When a composite sheet of greater thickness, or of increased electrical resistance and mechanical durability is desired, as shown in Fig. 2, the process is the same as described above under Fig. 1, until the layer of adhesive 4 has been deposited; in Fig. 2, a layer of bandage gum, (also known as "dental dam", which is a thin sheet of cured rubber), or varnished cambric, or other insulating fabric 6, is placed upon the adhesive 4, upon the layer 6 is placed adhesive 7, a sheet of flexible mica 8, adhesive 9, and an outer sheet of rubber 10. The process may be repeated until the desired multiplicity of layers and thickness has been attained and the selected top layer affixed. The composite sheet may then be further compressed or rolled, and if the adhesive used is of vulcanizable rubber or of some other kind requiring heat and/or pressure for development of maximum adhesion and other desirable properties, further treatment by heat and/or pressure may be given as needed. The finished composite sheet is then ready for use, or may be placed in storage for future shipment.

As an obvious variation in the above process, the inner sheets of insulating material may be first assembled in a manner similar to that described above and the product as a unit later cemented between the two sheets of rubber selected as top and bottom layers. Or any selection of intermediate layers including a layer of mica may be so prepared and incorporated as a unit.

The following essential points are to be noted:
1. The outer layers are of rubber, preferably with one outer side corrugated to insure the feet of the operator from slipping.
2. Each type of insulating material employed is in contact on both sides with an insulating layer of different material and all are of the nature of sheets with impervious surfaces. This is a new principle in the manufacture of flexible laminated insulating material. It is believed that the dielectric strength of the composite sheet is enhanced thereby, possibly because of the increased resistance to the passage of electricity from a surface of material of one nature to that of another. But whether because of this or not, the fact remains that sheets so constructed do in fact show enhanced dielectric strength.
3. The sheet materials and the adhesives employed are all of a flexible nature.
4. The composite flexible sheet always includes at least one inner layer of flexible mica sheet. In connection with the explanation given in paragraph 2 above it is also probable that the recognized high dielectric strength of laminated mica sheet alone adds considerably to the dielectric strength of the composite sheet, as compared with that of the commercial material which is merely of an integrated sheet composed of rubber and cloth layers alone.
5. In general it is found that the total dielectric strength is about equivalent to the sum of the individual dielectric strengths of the insulating sheets employed. This is not exactly true, however, because it is not always possible to control the manufacture of the component parts of the composite sheet in such a way as to produce their highest possible dielectric strengths, and also because of the occasional imperfections in the bonding of the various layers. Care in securing as nearly perfect bonding as possible is essential to obtain sheets with maximum dielectric strength.

Typical examples follow:

| Layers and materials employed | Thickness: inches | Final thickness: inches | Dielectric strength or puncture voltage, volts |
|---|---|---|---|
| 1. Rubber | 1/16 | 0.146 | 44916 |
| Flexible mica | 0.005 | | |
| Rubber | 1/16 | | |
| 2. Rubber | 1/16 | | |
| Flexible mica | 0.010 | 0.150 | 50160 |
| Rubber | 1/16 | | |
| 3. Rubber | 1/16 | | |
| Flexible mica | 0.20 | 0.172 | 55176 |
| Rubber | 1/16 | | |
| 4. Rubber | 1/16 | | |
| Heavy varnished cambric | | 0.152 | 50160 |
| Rubber | 1/16 | | |
| 5. Rubber | 1/16 | | |
| Varnished cambric | Thin. | | |
| Flexible mica | 0.10 | 0.175 | 49020 |
| Varnished cambric | Thin. | | |
| Rubber | 1/16 | | |
| 6. Rubber | 1/16 | | |
| Flexible mica | 0.10 | | |
| Varnished cambric | Thin. | | |
| Flexible mica | 0.10 | 0.179 | Above 59280 |
| Rubber | 1/16 | | |
| 7. Rubber | 1/16 | 0.214 | 64980 |
| Flexible mica | 0.005 | | |
| Bandage gum (cured rubber) | Thin. | | |
| Flexible mica | 0.005 | | |
| Bandage gum (cured rubber) | Thin. | | |
| Flexible mica | 0.005 | | |
| Rubber | 1/16 | | |
| Standard A. S. T. M. specifications for switchboard matting | | 0.25 | 40000 |
| Commercial hospital matting as purchased | | 0.129 | 37620 |

In the above table, Examples 1 to 4 inclusive are given as a means of comparison with Examples 5, 6, and 7.

Although it is admittedly difficult to obtain exact readings with so great puncture voltages because of heating and disturbance due to corona discharge, these results indicate quite clearly the relatively considerable increase (amounting in instances to 50% or more) in dielectric strength attained in sheets made as described herein. These sheets have the further property of retaining high dielectric strength for a longer time than the common high quality commercial sheet because of the longer life of the mica member. The latter is known to retain its original dielectric strength essentially unchanged over a period of years.

2. *Insulating blankets*

These are flexible insulating sheets which are thrown over or against high tension wires and conductors to shield the person of the electrician from casual contact.

Their preparation according to the present invention is the same in principle and detail as that of the switchboard matting, except that the insulating sheets used and the adhesive employed must be such as to permit a greater degree of flexibility in the finished article than that required for switchboard matting. This necessitates that use of flexible rubber sheeting, highly flexible mica sheeting, and an adhesive that develops and retains flexibility to a maximum extent. The adhesives referred to herein are efficient in this respect. The dielectric strength of the product obtained by my process is correspondingly higher than that of the commercial article for the same reasons as given above under switchboard matting.

3. *Electrician's gloves and boots*

The process of manufacturing these articles is somewhat different from that required for switchboard matting, although the principle is the same. The composite sheet material with smooth rubber surfaces in highly flexible condition and of suitable thickness is cut, sewed, layered with rubber, and vulcanized into a unit article. Because of the presence of mica pieces in the interior of the basic sheet, the process of sewing must be carefully handled to avoid disrupting the sheet; and it is necessary to cover the finished article with a penetrating layer of rubber, as by immersing the glove several times in a dissolved rubber solution, or in latex, until a sufficient coating is formed, and then vulcanize on a mold to insure the absence of needle holes, slippage, thin places, buckled spots and the like, which faults are encountered, however, chiefly when haste or insufficient care is used in the cutting, fitting and stitching processes.

Products of this kind may also be made by merely vulcanizing a thin sheet of flexible mica between two layers of rubber to obtain the raw composite sheet material, Fig. 1, from which the article is later manufactured as above described. Or, the article first shaped preferably from thin cloth lined rubber, while still on the mold, may be covered with mica pieces or thin flexible mica cemented in place, or fitted with molding mica pieces which are then fixed in place by heating and cementing; the mica layer, however prepared, is then covered with a layer of adhesive, and then a layer of insulating material, and the process continued in a manner similar to that described above under switchboard matting, with the addition of a final layer of vulcanizable rubber the proper thickness has been built up. Thereafter the article is vulcanized in a mold and is then ready for use.

The new process of producing flexible insulating products described herein is adaptable to the production of a variety of articles possessing an unusually high dielectric strength, and therefore insuring a higher factor of safety to the operator; in addition the process is simple, commercially feasible, and involves no extraordinary expense.

I claim:

1. A switchboard matting having a high dielectric strength consisting of a plurality of impervious flexible layers of insulating material, including at least one layer of mica, and a layer of a flexible insulating fabric, and having outer layers of rubber, said layers being cemented together by an adhesive comprising a viscous colloidal aqueous association of an alkali metal metaphosphate.

2. A flexible insulating sheet, comprising an inner layer of varnished cambric, adjacent layers of mica flakes secured to said varnished cambric by a flexible insulating adhesive, and outer layers of sheet rubber secured to said mica flake layers by a flexible insulating adhesive.

3. A flexible insulating sheet, comprising an inner layer of mica flakes, adjacent layers of bandage gum secured to said inner layer of mica flakes by a flexible insulating adhesive, additional layers of mica flakes secured to the outer sides of said layers of said bandage gum by a flexible insulating adhesive, and outer layers of sheet rubber secured to the outer sides of said additional layers of mica flakes by a flexible insulating adhesive.

4. A flexible insulating sheet, comprising an inner layer of mica flakes, adjacent layers of varnished cambric secured to the sides of said layer of mica flakes by a flexible insulating adhesive, and outer layers of sheet rubber secured to the outer sides of said layers of varnished cambric by a flexible insulating adhesive.

WILLIS A. BOUGHTON.